(12) United States Patent
Kamiya et al.

(10) Patent No.: US 11,521,105 B2
(45) Date of Patent: Dec. 6, 2022

(54) MACHINE LEARNING DEVICE AND MACHINE LEARNING METHOD FOR LEARNING FAULT PREDICTION OF MAIN SHAFT OR MOTOR WHICH DRIVES MAIN SHAFT, AND FAULT PREDICTION DEVICE AND FAULT PREDICTION SYSTEM INCLUDING MACHINE LEARNING DEVICE

(71) Applicant: FANUC CORPORATION, Yamanashi (JP)

(72) Inventors: Yohei Kamiya, Yamanashi (JP); Yasuo Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1052 days.

(21) Appl. No.: 15/481,575

(22) Filed: Apr. 7, 2017

(65) Prior Publication Data

US 2017/0293862 A1    Oct. 12, 2017

(30) Foreign Application Priority Data

Apr. 8, 2016    (JP) .............................. JP2016-078247

(51) Int. Cl.
*G06N 20/00*    (2019.01)
*G01M 15/14*    (2006.01)
(Continued)

(52) U.S. Cl.
CPC ............ *G06N 20/00* (2019.01); *G01M 15/02* (2013.01); *G01M 15/14* (2013.01); *G01N 29/14* (2013.01);
(Continued)

(58) Field of Classification Search
CPC ....... G06N 20/00; G01M 15/14; G01N 29/14; G01N 29/4481
See application file for complete search history.

(56) References Cited

U.S. PATENT DOCUMENTS 6,326,758 B1 * 12/2001 Discenzo ........... G05B 23/0243
318/432
8,301,406 B2 * 10/2012 Lee ..................... G05B 23/0254
702/77
(Continued)

FOREIGN PATENT DOCUMENTS

CN      101859128 A     10/2010
CN      102478825 A      5/2012
(Continued)

OTHER PUBLICATIONS

Filippetti et al., "Recent Development of Induction Motor Drives Fault Diagnosis Using AI Techniques", IEEE, (2000). (Year: 2000).*
(Continued)

*Primary Examiner* — Alexey Shmatov
*Assistant Examiner* — Beatriz Ramirez Bravo
(74) *Attorney, Agent, or Firm* — Hauptman Ham, LLP

(57) ABSTRACT

A machine learning device which learns fault prediction of one of a main shaft of a machine tool and a motor driving the main shaft, including a state observation unit observing a state variable including at least one of data output from a motor controller controlling the motor, data output from a detector detecting a state of the motor, and data output from a measuring device measuring a state of the one of the main shaft and the motor; a determination data obtaining unit obtaining determination data upon determining one of whether a fault has occurred in the one of the main shaft and the motor and a degree of fault; and a learning unit learning the fault prediction of the one of the main shaft and the motor in accordance with a data set generated based on a combination of the state variable and the determination data.

13 Claims, 8 Drawing Sheets

(51) Int. Cl.
*G01N 29/14* (2006.01)
*G01N 29/44* (2006.01)
*G06N 3/04* (2006.01)
*G06N 3/08* (2006.01)
*G01M 15/02* (2006.01)
*G06N 5/04* (2006.01)
*H04L 67/10* (2022.01)

(52) U.S. Cl.
CPC ..... *G01N 29/4436* (2013.01); *G01N 29/4445* (2013.01); *G01N 29/4454* (2013.01); *G01N 29/4481* (2013.01); *G06N 3/0445* (2013.01); *G06N 3/084* (2013.01); *G06N 5/04* (2013.01); *H04L 67/10* (2013.01); *G01N 2291/0258* (2013.01); *G01N 2291/2696* (2013.01)

(56) References Cited

U.S. PATENT DOCUMENTS

| 9,205,560 | B1* | 12/2015 | Edsinger | B25J 9/1674 |
| 2003/0027363 | A1 | 2/2003 | Kodama | |
| 2005/0111988 | A1* | 5/2005 | Griffiths | F04B 51/00 417/53 |
| 2015/0261649 | A1* | 9/2015 | Boehm | G06F 11/0754 714/47.3 |
| 2015/0293523 | A1 | 10/2015 | Yamamoto et al. | |
| 2016/0282847 | A1* | 9/2016 | Germann | B23K 11/00 |
| 2017/0051978 | A1* | 2/2017 | Pal | F26B 25/009 |
| 2017/0178311 | A1* | 6/2017 | Pal | H04W 4/80 |

FOREIGN PATENT DOCUMENTS

| CN | 104391480 A | 3/2015 |
| CN | 105081879 A | 11/2015 |
| CN | 205129520 U | 4/2016 |
| JP | 63-123105 A | 5/1988 |
| JP | 10-039908 A | 2/1998 |
| JP | 2001-259972 A | 9/2001 |
| JP | 3288255 B2 | 6/2002 |
| JP | 2005-074545 A | 3/2005 |
| JP | 2006-092241 A | 4/2006 |
| JP | 2014-96050 A | 5/2014 |
| JP | 5684941 B1 | 3/2015 |
| JP | 2015-203646 A | 11/2015 |

OTHER PUBLICATIONS

Singh et al., "Rotor Faults Diagnosis Using Artificial Neural Networks and Support Vector Machines", International Journal of Acoustics and Vibrations, (2015). (Year: 2015).*

J. Wu et al., "Machine Learning Approach for Shaft Crack Detection Through Acoustical Emission Signals", IEEE, (2005). (Year: 2005).*

* cited by examiner

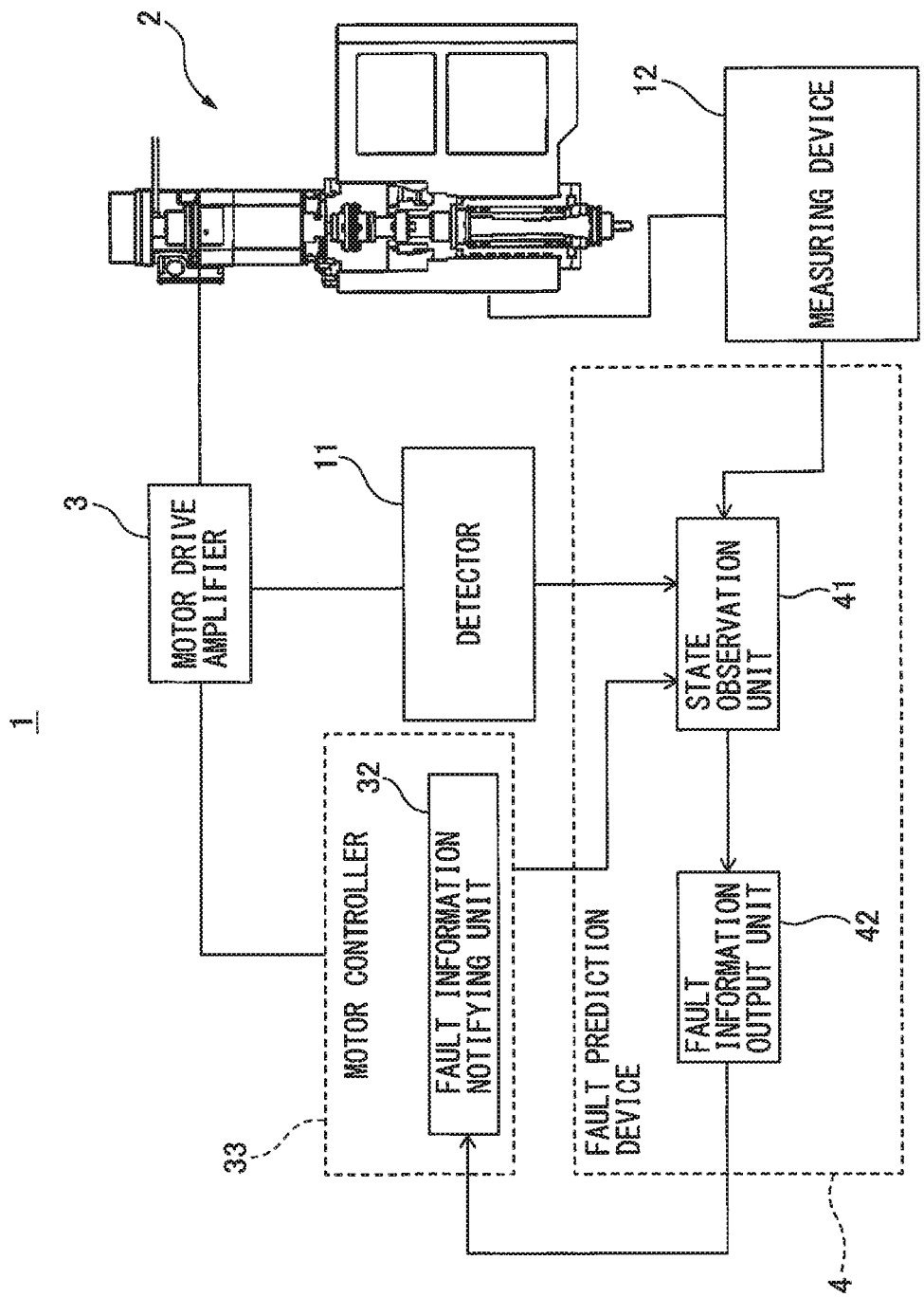

MACHINE LEARNING DEVICE AND MACHINE LEARNING METHOD FOR LEARNING FAULT PREDICTION OF MAIN SHAFT OR MOTOR WHICH DRIVES MAIN SHAFT, AND FAULT PREDICTION DEVICE AND FAULT PREDICTION SYSTEM INCLUDING MACHINE LEARNING DEVICE

RELATED APPLICATIONS

The present application claims priority to Japanese Patent Application No. 2016-078247 filed Apr. 8, 2016, the disclosures of which is hereby incorporated by reference herein in its entirety.

BACKGROUND OF THE INVENTION

1. Field of the Invention

The present invention relates to a machine learning device and a machine learning method for learning fault prediction of a main shaft or a motor which drives the main shaft, and a fault prediction device and a fault prediction system including the machine learning device.

2. Description of the Related Art

Most faults of a main shaft of a machine tool or a main-shaft motor (motor) which drives the main shaft are deterioration or damage of the main shaft or a bearing of the motor. When the machine tool is used with its main shaft suffering a complete fault, for example, the processing accuracy of a workpiece degrades, thus producing a defective product. In addition, long-time repairing of the main shaft causes a considerable downtime (OFF time) in the machine tool, thus lowering the operating ratio of the machine tool.

Under the circumstances, before the main shaft suffers a complete fault, when its symptom (deterioration) is detected and, for example, an appropriate measure such as repair of the main shaft is taken, the downtime can be reduced (shortened) to improve the operating ratio of the machine tool. Conventionally, as methods for detecting an abnormality of the main shaft, a method for measuring degradation in vibration of the main shaft or the motor and a method for detecting an abnormal sound to, in turn, detect an abnormality of the main shaft, for example, are known.

Japanese Laid-Open Patent Publication No. 2005-074545, for example, discloses a state monitoring device for a machine tool which measures vibration data using an AE sensor, an amplifier, and a band-pass filter in response to a reception of a main shaft rotate command and a feed shaft drive command. Then, a level counting circuit is used to count the number of measured vibration data which exceed a threshold obtained from main shaft rotation information, the state of the main shaft is determined by a comparison between the obtained count number and the alarm level, and an alarm is displayed on an alarm indicator as appropriate.

Japanese Laid-Open Patent Publication No. 2001-259972 discloses a magnetic bearing device for a machine tool including vibration detection means for detecting vibration of a main shaft, frequency characteristic variable filter which extracts a vibration component synchronized with rotation of the main shaft in a signal output from the vibration detection means, and determination means for determining that the state in which the level of a signal output from the frequency characteristic variable filter in the extracted signal exceeds a defined level as an abnormal state, which are provided to allow automatic detection of an abnormal state such as a mounting failure or rotation failure of a tooling, in turn, allow reduction in processing degradation of a workpiece.

Japanese Laid-Open Patent Publication No. S63-123105 discloses a fault prediction diagnosis method for comparing the operation pattern of a robot in operation with a reference operation pattern for the robot in a normal state to predict a fault of the robot.

Japanese Laid-Open Patent Publication No. H10-039908 discloses a fault prediction method for comparing the difference between the load-side power based on the actual operation state of a drive shaft and the driving-side power based on an operation command issued to the drive shaft with a determination value to evaluate whether a robot mechanism portion has deteriorated and the level of deterioration.

In this specification, a "machine tool" includes not only industrial robots and industrial machines controlled by CNC (Computer Numerical Control) devices but also service robots and various mechanical devices.

For example, to detect vibration of a main shaft of a machine tool, a vibration measuring device or the like may be preferably attached to a motor or the main shaft, but when vibration is manually measured, the operator or the like may preferably hold the vibration measuring device and periodically measure vibration of each unit of the machine tool, and this operation inflicts a significant burden on the operator. It is possible to automatically measure vibration of the main shaft using a vibration sensor or the like, but the vibration sensor may be preferably always attached to the main shaft in this case, thus raising the cost of the machine tool.

When, for example, an abnormality is detected by catching an abnormal sound of the main shaft, it is very laborious for the operator to periodically check abnormal sounds of each machine tool by human audition. It is possible to automatically detect abnormal sounds using a microphone or the like, but in general, since much noise is made in a factory equipped with machine tools, it is not easy to appropriately detect abnormal sounds and costs are incurred in locating a microphone in this case.

In recent years, with complication and sophistication of machine tools, factors which may lead to faults are getting more complicate and it is even becoming difficult to predict a fault of a main shaft of a machine tool or a motor which drives the main shaft. In other words, since a fault prediction method executed in accordance with a predetermined criterion is often inapplicable to actual circumstances or inaccurate, a technique which enables accurate fault prediction according to the circumstances involved is demanded.

In view of this, it is an object of the present invention to provide a machine learning device and a machine learning method which can detect a symptom of a fault (abnormality) of a main shaft of a machine tool or a motor which drives the main shaft before the main shaft or the motor suffers the fault, and a fault prediction device and a fault prediction system including the machine learning device. It is another object of the present invention to provide a machine learning device and a machine learning method which can find a symptom of a fault in a main shaft or a motor of a machine tool earlier than the above-described conventional techniques to reduce the downtime, and a fault prediction device and a fault prediction system including the machine learning device. It is still another object of the present invention to provide a machine learning device and a machine learning method which can, for example, estimate the life of a main shaft or the like by a comparison with the past learning to allow more planned repairing and limited-product arrangement to reduce the downtime and the cost, and a fault prediction device and a fault prediction system including the machine learning device.

SUMMARY OF INVENTION

According to a first aspect of the present invention, there is provided a machine learning device which learns fault prediction of one of a main shaft of a machine tool and a motor which drives the main shaft, including a state observation unit which observes a state variable including at least one of data output from a motor controller which controls the motor, data output from a detector which detects a state of the motor, and data output from a measuring device which measures a state of the one of the main shaft and the motor; a determination data obtaining unit which obtains determination data upon determining one of whether a fault has occurred in the one of the main shaft and the motor and a degree of fault; and a learning unit which learns the fault prediction of the one of the main shaft and the motor in accordance with a data set generated based on a combination of the state variable and the determination data.

The data output from the motor controller may include a torque command value and a velocity command value for driving the motor, the detector may include at least one of a current detection unit which detects a current of the motor and a velocity detection unit which detects a velocity of the motor, and the measuring device may include at least one of a vibration measuring unit which measures vibration of the one of the main shaft and the motor, a sound measuring unit which measures a sound in vicinity of the one of the main shaft and the motor, and a temperature measuring unit which measures a temperature in the vicinity of the one of the main shaft and the motor. The main shaft may execute a predetermined operation pattern at an interval of not less than a predetermined time, and the state observation unit may observe the state variable in at least one of an accelerated state of the main shaft, a constant velocity-operated state of the main shaft, and one of a decelerated state of the main shaft and a coasted state of the main shaft upon cutoff of a driving force, in the operation pattern.

The machine learning device may learn the fault prediction of the one of the main shaft and the motor in accordance with a plurality of data sets generated for the one of the main shaft and the motor. The learning unit may learn a normal state only during a certain period and then detects occurrence of a fault determined by the determination data obtaining unit. When the determination data obtaining unit obtains determination data indicating a fault of the one of the main shaft and the motor, the learning unit may update a conditional equation used for the fault prediction of the one of the main shaft and the motor by weighting the determination data included in the data set in accordance with a length of time from when the determination data is obtained until a fault occurs. The state observation unit may obtain a current state variable of the state variable via a network.

According to a second aspect of the present invention, there is provided a fault prediction device which includes the machine learning device according to the above first aspect and predicts a fault of the one of the main shaft and the motor, the fault prediction device further including a fault information output unit which outputs fault information indicating one of whether a fault has occurred in the one of the main shaft and the motor and a degree of fault, in response to input of a current state variable of the state variable, based on a learning result obtained by the learning unit in accordance with the data set.

The learning unit may learn the fault prediction of the one of the main shaft and the motor again in accordance with an additional data set generated based on a combination of the current state variable and the determination data. The machine learning device may be located on a cloud server. The machine learning device may be built in a controller which controls the machine tool. The machine tool may include a plurality of machine tools, and the learning result obtained by the machine learning device is shared by the plurality of machine tools.

According to a third aspect of the present invention, there is provided a fault prediction system including the fault prediction device according to the above second aspect; the detector; the measuring device; and a fault information notifying unit which notifies an operator of the fault information. A time at which the fault information notifying unit may notify the operator of the fault information satisfies at least one of precedence to a time defined by a first predetermined period preceding a time at which a fault occurs, and subsequence to a time defined by a second predetermined period preceding the time at which a fault occurs.

According to a fourth aspect of the present invention, there is provided a machine learning method for learning fault prediction of one of a main shaft of a machine tool and a motor which drives the main shaft, the method including observing a state variable including at least one of data output from a motor controller which controls the motor, data output from a detector which detects a state of the motor, and data output from a measuring device which measures a state of the one of the main shaft and the motor; obtaining determination data upon determining one of whether a fault has occurred in the one of the main shaft and the motor and a degree of fault; and learning the fault prediction of the one of the main shaft and the motor in accordance with a data set generated based on a combination of the state variable and the determination data.

BRIEF DESCRIPTION OF THE DRAWINGS

The present invention will be more clearly understood by reference to the accompanying drawings, in which:

FIG. 7 is a block diagram illustrating an exemplary fault prediction system according to another embodiment;

DETAILED DESCRIPTION

Figure 1:
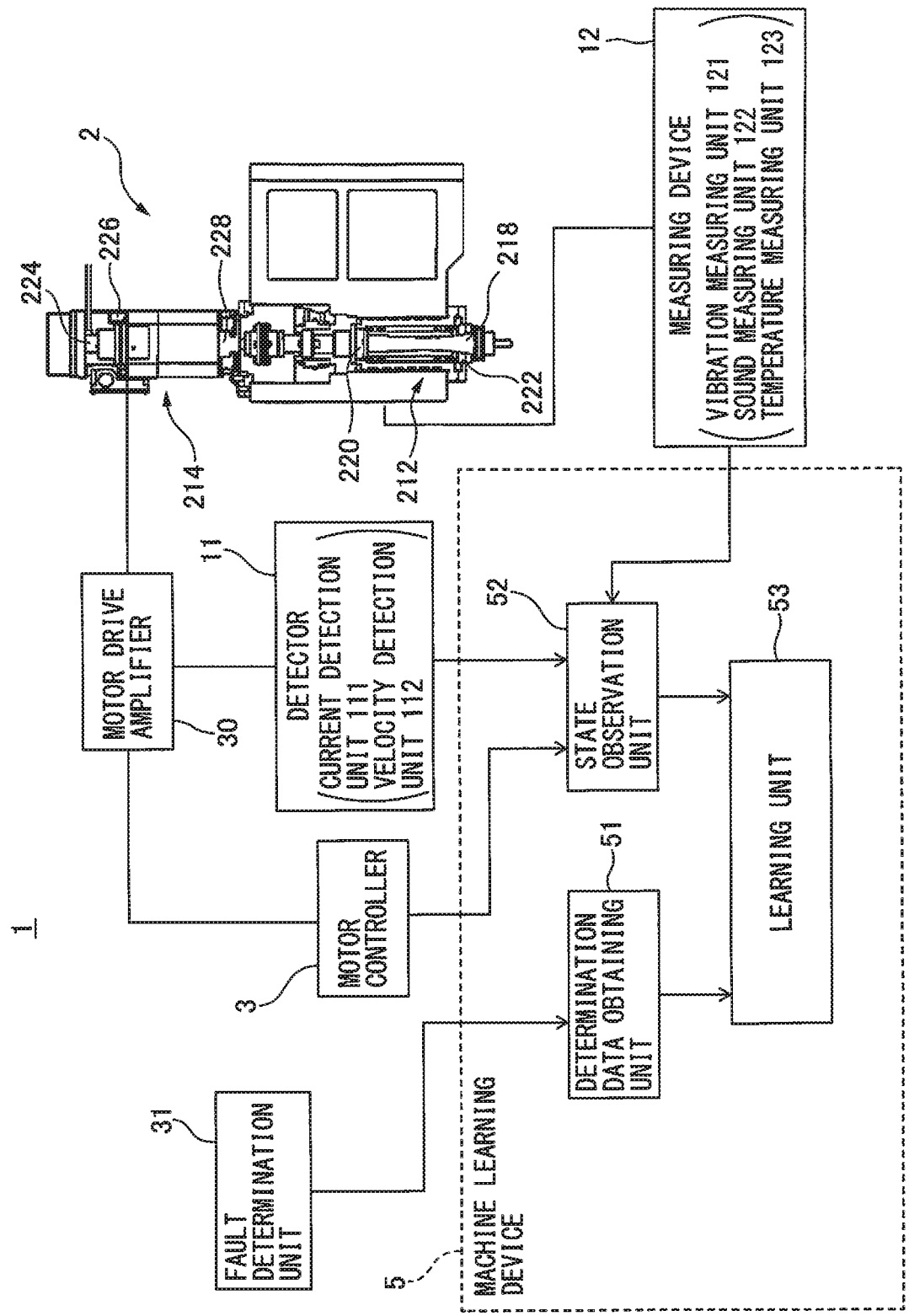
FIG. 1 is a block diagram illustrating an exemplary fault prediction system according to an embodiment.

An embodiment of a machine learning device and a machine learning method, and a fault prediction device and a fault prediction system including the machine learning device according to the present invention will be described below with reference to the accompanying drawings. FIG. 1 is a block diagram illustrating an exemplary fault prediction system according to an embodiment and illustrates only its main part. A fault prediction system 1 learns fault prediction of a main shaft 212 of a machine tool 2 or a motor 214 which drives the main shaft 212, using a machine learning device 5 having the machine learning function. The fault prediction system 1 can generate fault information indicating whether a fault has occurred in the main shaft 212 of the machine tool 2 or the motor 214 that drives the main shaft 212, or the degree of fault, based on the learning result obtained by the machine learning device 5.

In this specification, a "machine tool" means various mechanical devices including industrial robots, service robots, and machines controlled by CNC (Computer Numerical Control) devices. Further, a "fault of a main shaft of a machine tool or a motor which drives the main shaft" includes faults of components constituting the machine tool. In other words, a "fault of a main shaft of a machine tool or a motor which drives the main shaft" is not limited to the state in which an intended function of the machine tool may not be executable, but it includes, e.g., the state in which normal operation may be temporarily or permanently unreproducible.

The "Fault information" generated by the fault prediction system 1 includes information indicating whether a fault has occurred in the main shaft 212 of the machine tool 2 or the motor 214 that drives the main shaft 212, or information indicating the degree of fault. The "fault information" may further include information indicating that the machine tool is in a normal state. The "degree of fault" means the fault seriousness and, for example, either one of its maximum value or minimum value may be limited. The "degree of fault" may be a continuous or discrete quantity, and, for example, the operator can decide whether the target component is to be replaced or repaired immediately or in the next maintenance operation, or the like, in accordance with the "degree of fault."

The fault prediction system 1 used to predict a fault of the main shaft 212 of the machine tool (industrial machine) 2 or the motor 214 that drives the main shaft 212 will be described hereinafter. However, the present invention may be similarly applicable to any optional machine tools (mechanical devices), as a matter of course.

The fault prediction system 1 according to this embodiment includes, e.g., a motor controller 3, a motor drive amplifier 30, a fault determination unit 31, a detector 11, a measuring device 12, and a machine learning device 5, as depicted in FIG. 1. The machine learning device 5 includes a determination data obtaining unit 51, a state observation unit 52, and a learning unit 53.

The machine tool 2 includes, e.g., a main shaft 212 and a motor 214 such as a servomotor which rotates and drives the main shaft 212, and the motor 214 is controlled by the motor controller 3 through the motor drive amplifier 30. The main shaft 212 includes a rotatable main shaft rotor 218 and main shaft bearings 220 and 222 which rotatably support the two axial end portions of the main shaft rotor 218. The motor 214 includes a rotatable motor rotor 224 and motor bearings 226 and 228 which rotatably support the two axial end portions of the motor rotor 224.

The motor controller 3 is implemented in a digital computer including, e.g., an interface connected to a CPU, a ROM, a RAM, a non-volatile memory, and an external device (not illustrated), controls the motor 214 through the motor drive amplifier 30 and outputs, e.g., a torque command value and a velocity command value for driving the motor 214 to the state observation unit 52 of the machine learning device 5. The fault determination unit 31 determines whether a fault has occurred in the machine tool 2 (motor 214) or the degree of fault and outputs data obtained by the determination (determination data) to the determination data obtaining unit 51 of the machine learning device 5.

In other words, the fault determination unit 31 determines a fault of the machine tool 2, using, e.g., a known fault diagnosis method. The fault determination unit 31 determines whether a fault has occurred in the machine tool 2 or the degree of fault, independently of fault information generated by the fault prediction system 1. When, for example, a disturbance torque detected by a torque sensor or the amplitude of vibration of data output from a sensor exceeds a predetermined threshold, the fault determination unit 31 determines that a fault has occurred. The fault determination unit 31 may determine that a fault has occurred in the machine tool 2, based on, e.g., internal data of control software stored in the motor controller 3. In this manner, the fault determination unit 31 determines faults based on various factors. The determination result obtained by the fault determination unit 31 is input to a determination data obtaining unit 51 of the machine learning device 5 (to be described later). In another embodiment, the machine learning device 5 may be configured to use the determination data obtaining unit 51 to receive fault information in response to the input operation by an operator who has discovered or been informed about a fault of the machine tool 2.

The detector 11, for example, detects and outputs a current and a velocity for driving the motor 214 to the state observation unit 52. In other words, the detector 11 includes, e.g., a current detection unit 111 which detects the driving current of the motor 214 in the machine tool 2, and a velocity detection unit 112 which detects the velocity (rotational velocity) of the motor 214. Since the current detection unit 111 and the velocity detection unit 112 in the detector 11 may be normally preferably used in driving control of the motor, no new configuration may be added.

The measuring device 12 measures the state of the main shaft 212 or the motor 214 and includes, e.g., a vibration measuring unit 121 which measures the vibration of the main shaft 212 or the motor 214, a sound measuring unit 122 which measures the sound in the vicinity of the main shaft 212 or the motor 214, and a temperature measuring unit 123 which measures the temperature in the vicinity of the main shaft 212 or the motor 214.

The vibration measuring unit 121, for example, measures and outputs the vibration of the main shaft bearing 220 (main shaft 212) or the motor bearing 226 (motor 214) using a vibration sensor mounted on the main shaft bearing 220 or the motor bearing 226. The sound measuring unit 122, for example, measures and outputs the sound in the vicinity of the main shaft 212 or the motor 214 using a sound collection microphone mounted in the vicinity of the main shaft bearing 220 or the motor bearing 226. The temperature measuring unit 123, for example, measures and outputs the temperature in the vicinity of the main shaft 212 or the motor 214 using a temperature sensor mounted on the main shaft bearing 220 or the motor bearing 226. The temperature measuring unit 123 can be implemented in, e.g., a thermocouple (temperature sensor) and a data logger (temperature data logger corresponding to thermocouple). A vibration sensor, a sound collection microphone, and a temperature sensor can be located at optimal positions in accordance with, e.g., the type, shape, and specification of the machine tool 2, as a matter of course.

In this manner, in the machine learning device 5, the determination data obtaining unit 51 obtains determination data which is obtained by determining whether a fault has occurred in the main shaft 212 or the motor 214, or the degree of fault, and is output from the fault determination unit 31. The state observation unit 52 receives the state variables (a quantity of state) of the machine tool 2, including a torque command value and a velocity command value for driving the motor 214 output from the motor controller 3, the driving current and the rotational velocity of the motor 214 output from the detector 11 (a current detection unit 111 and a velocity detection unit 112), the vibration of the main shaft 212 or the motor 214 output from the measuring device 12 (the vibration measuring unit 121, the sound measuring unit 122, and the temperature measuring unit 123), and the sound and the temperature in the vicinity of the main shaft 212 or the motor 214. The state observation unit 52 may not receive all of the above-mentioned state variables, may receive some of them, or may receive additional state variables.

The learning unit 53 learns fault prediction based on a data set generated based on a combination of the state variables output from the state observation unit 52 and the determination data output from the determination data obtaining unit 51. The data set is data obtained by associating the state variables and the determination data with each other. In other words, since, for example, ambient noise and vibration are generally significant under the environment in which machine tools 2 are used, it is difficult to predict a fault of the main shaft 212 or the motor 214 using a method for simply setting a threshold and performing control. In contrast to this, the fault prediction system according to this embodiment enables more accurate fault prediction based on features of the influence (state variables) exerted on a fault of the main shaft 212 or the motor 214 by, e.g., separating the ambient influence by machine learning.

The machine learning device 5 is used to learn fault prediction of the motor 214 that drives the main shaft 212, but the machine learning device 5 is, for example, connected to the machine tool 2 via a network and may be a digital computer independently from the motor controller 3. In another embodiment, the machine learning device 5 may be built into the motor controller 3. In this case, the machine learning device 5 executes machine learning using a processor in the motor controller 3. In still another embodiment, the machine learning device 5 may be located on a cloud server.

Figure 2:
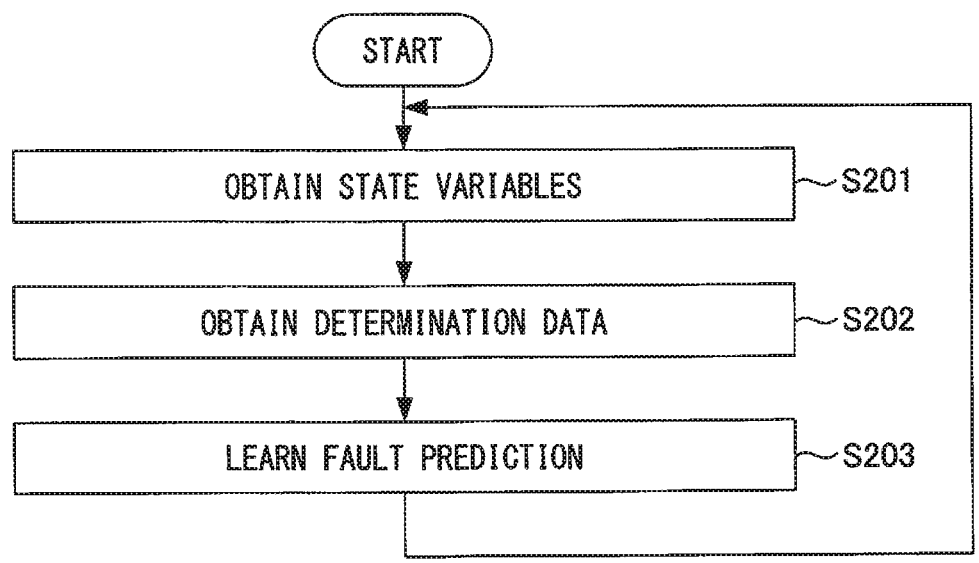
FIG. 2 is a flowchart for explaining an exemplary learning process by a machine learning device depicted in FIG. 1.

FIG. 2 is a flowchart for explaining an exemplary learning process by a machine learning device depicted as FIG. 1. As illustrated in FIG. 2, when an exemplary learning process by the machine learning device 5 is started, in step S201 the state observation unit 52 obtains state variables including, e.g., a torque command value and a velocity command value output from the motor controller 3, a driving current and a rotational velocity output from the detector 11, the vibration of the main shaft 212 or the motor 214 output from the measuring device 12, and the sound and the temperature in the vicinity of the main shaft 212 or the motor 214.

The process advances to step S202, in which the determination data obtaining unit 51 obtains determination data which is obtained by determining whether a fault has occurred in the main shaft 212 or the motor 214, or the degree of fault, and is output from the fault determination unit 31. The process advances to step S203, in which the learning unit 53 learns fault prediction in accordance with a data set generated based on a combination of the state variables obtained in step S201 and the determination data obtained in step S202.

The processes in steps S201 to S203 are repeated until, for example, the machine learning device 5 satisfactorily learns fault prediction of the main shaft 212 or the motor 214. The main shaft 212 (motor 214) preferably executes, e.g., a predetermined operation pattern at an interval of a predetermined time or more.

Figure 3A:
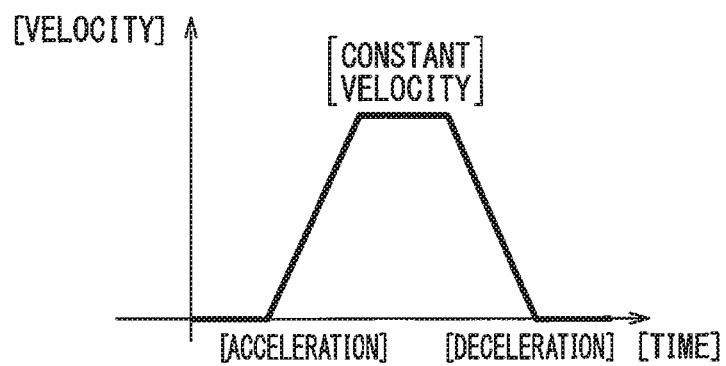
FIG. 3A and FIG. 3B are graphs for explaining exemplary operation patterns applied to the fault prediction system depicted in FIG. 1.
Figure 3B:
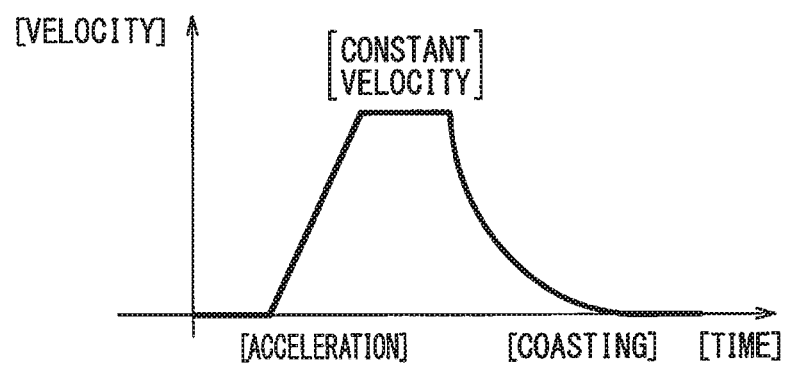

FIG. 3A and FIG. 3B are graphs for explaining exemplary operation patterns applied to the fault prediction system depicted as FIG. 1. FIG. 3A illustrates an exemplary change in velocity of the main shaft 212 with respect to time when the main shaft 212 is changed as [Acceleration]→[Constant Velocity]→[Deceleration] (an exemplary predetermined operation pattern), and FIG. 3B illustrates another exemplary change in velocity of the main shaft 212 with respect to time when the main shaft 212 is changed as [Acceleration]→[Constant Velocity]→[Coasting] (another exemplary predetermined operation pattern). The [Coasting] illustrated as FIG. 3B represents the state in which the main shaft 212 performs a coasting operation by cutting off a driving force while the main shaft 212 (motor 214) is controlled in rotation at a constant velocity.

When the machine learning device 5 learns fault prediction of the main shaft 212 or the motor 214, it is preferable to, e.g., execute a predetermined operation pattern at an interval of a predetermined time or more, as illustrated as FIG. 3A and FIG. 3B so that the state observation unit 52 observes the state variables in at least one of the accelerated state of the main shaft 212, the constant velocity-operated state of the main shaft 212, and the decelerated state or the coasted state of the main shaft 212 in the operation pattern.

In other words, execution of a predetermined operation pattern as illustrated as FIG. 3A and FIG. 3B is equivalent to a health check operation, machine learning based on such a health check operation can promote learning under the same conditions for data measurement, and limitation of data measurement to a characteristic operation can keep the data size less.

For example, the main shaft 212 has a high velocity (rotates at a high velocity), and is therefore expected to have a symptom of a fault appearing in high frequencies. In this manner, high-speed sampling may be preferably done to identify a symptom of high frequencies, but since this involves large data size per unit time and it is difficult to process data obtained for a long period of time, it is preferable to execute a predetermined operation pattern at an interval of a predetermined time or more. Coasting is performed by cutting off power supplied to the motor 214, as described above. In coasting, no current may be measurable, but a state set by removing the influence of a current may be observable instead, so that a symptom of a fault different from that in deceleration can be identified.

Figure 4:
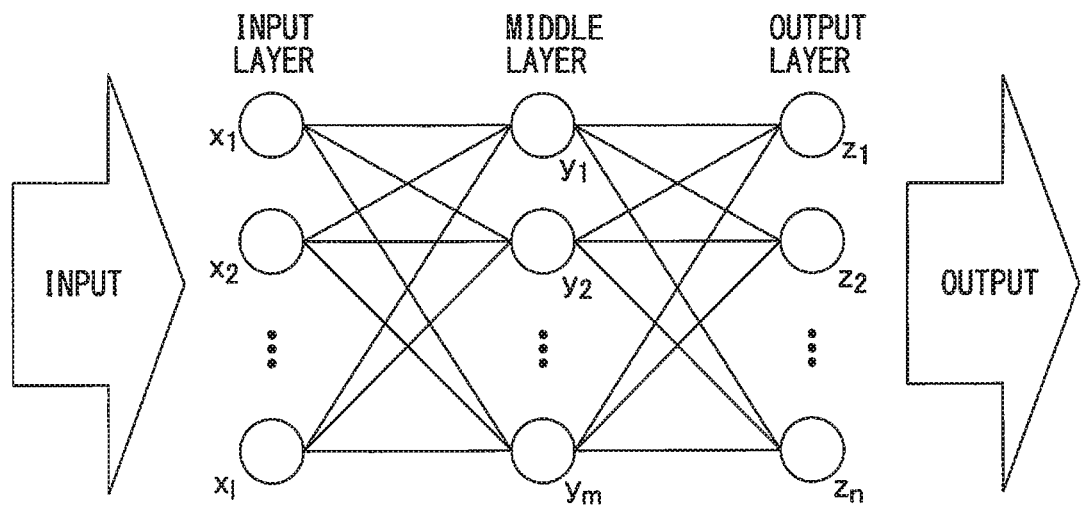
FIG. 4 is a diagram illustrating an exemplary configuration of a neural network.

FIG. 4 is a diagram illustrating an exemplary configuration of a neural network. The learning unit 53 in the above-mentioned machine learning device 5 may learn fault prediction in accordance with, e.g., a neural network model. The neural network includes an input layer including one neurons $x_1, x_2, x_3, \ldots, x_1$, a middle layer (hidden layer)

including m neurons $y_1, y_2, y_3, \ldots, y_m$, and an output layer including n neurons $z_1, z_2, z_3, \ldots, z_n$, as depicted in FIG. 4. Although FIG. 4 depicts only one middle layer, two or more middle layers may be formed. Although the machine learning device 5 (neural network) may use a general-purpose computer or processor, the use of, e.g., GPGPUs (General-Purpose computing on Graphics Processing Units) or large-scale PC clusters allows higher-speed processing.

The neural network learns fault prediction of the main shaft 212 or the motor 214 that drives the main shaft 212, associated with a fault of the machine tool 2. The neural network learns the relationship between the state variables observed by the state observation unit 52 and the occurrence of a fault, i.e., fault prediction of the main shaft 212 or the motor 214, by so-called "supervised learning," in accordance with a data set generated based on a combination of these state variables and the determination data obtained by the determination data obtaining unit 51. In "supervised learning," a large number of sets of data of certain inputs and results (labels) are fed into a learning device, which may learn features observed in these data sets and inductively acquire a model for estimating the result from the input, i.e., their relationship.

Alternatively, the neural network may accumulate only state variables while no fault has occurred, i.e., while the machine tool 2 is in normal operation, to learn fault prediction of the main shaft 212 or the motor 214 by so-called "unsupervised learning." When, for example, the rate of occurrence of a fault of the machine tool 2 is very low, "unsupervised learning" may be effective. In "unsupervised learning," only large pieces of input data are fed into the machine learning device 5, which learns the distribution of the input data and learns a device which, e.g., compresses, classifies, and shapes the input data, without corresponding teacher output data being fed into the machine learning device 5. This allows, e.g., clustering of features seen in these data sets into similar features. The obtained result can be used to define certain criteria and allocate outputs in an optimizing manner according to the criteria, thus predicting an output. Intermediate problem setting between "unsupervised learning" and "supervised learning," called "semi-supervised learning," is also available. This applies when, for example, only some pieces of data serve as pieces of data sets of inputs and outputs and the remaining pieces of data include only inputs.

Figure 5:
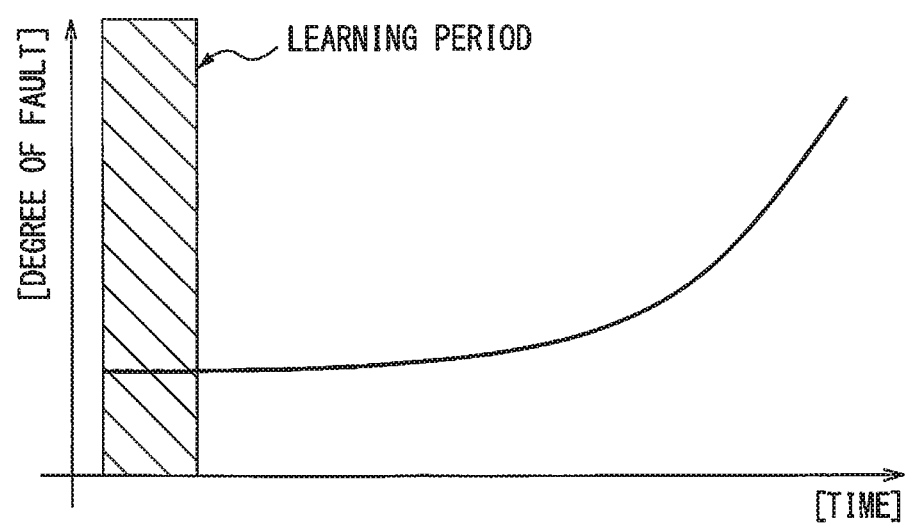
FIG. 5 is a graph for explaining an exemplary learning period in an unsupervised learning method.

FIG. 5 is a graph for explaining an exemplary learning period in an unsupervised learning method. The abscissa represents time (elapse of time) and the ordinate represents the degree of fault. In the above-described "unsupervised learning" method, a certain predetermined period, for example, several weeks, starting from, e.g., immediately after shipment or maintenance of the machine tool 2 is established as a learning period. Only during this period, the state variables are updated and the resultant state is defined as being normal, as illustrated as FIG. 5. After the learning period, the state variables are no longer updated and solely abnormality determination is performed, by outputting a "degree of fault" on the basis of the distance between the result output from the neural network and the normal model, thus achieving abnormality detection.

In this embodiment, since, for example, time-series data having a certain temporal correlation is modeled, the use of a neural network called the recurrent type is also effective. An RNN (Recurrent Neural Network) forms a learning model not by exclusively using the state at the current time instant but also using the internal states at the previous time instants, together. The recurrent neural network can be handled similarly to the general neural network, assuming the network expanded along the time axis. Although a variety of recurrent neural networks are available, a simple recurrent network (Elman Network) will be taken as an example below.

Figure 6A:
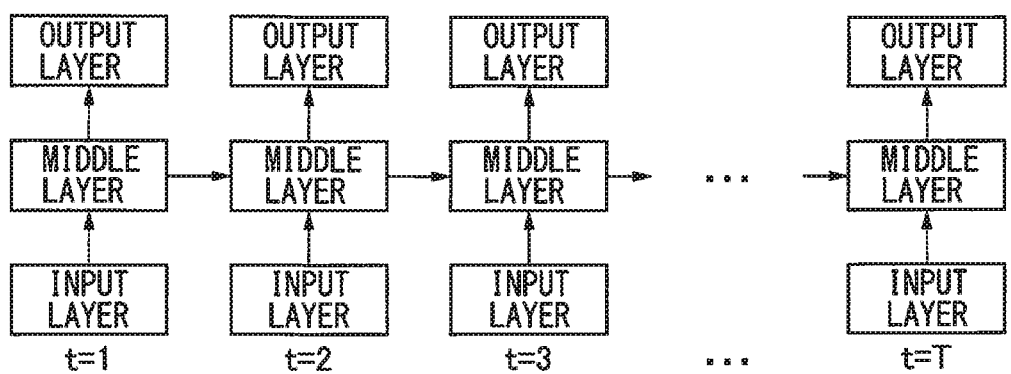
FIG. 6A and FIG. 6B are views for explaining an exemplary recurrent neural network.
Figure 6B:
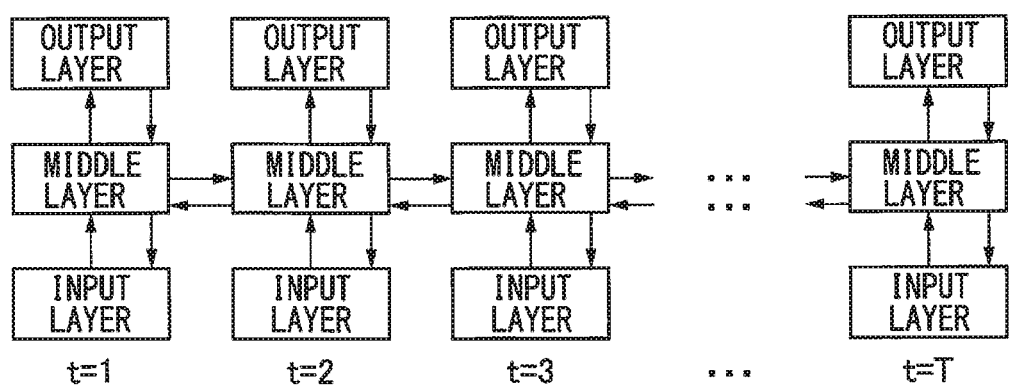
Figure 8A:
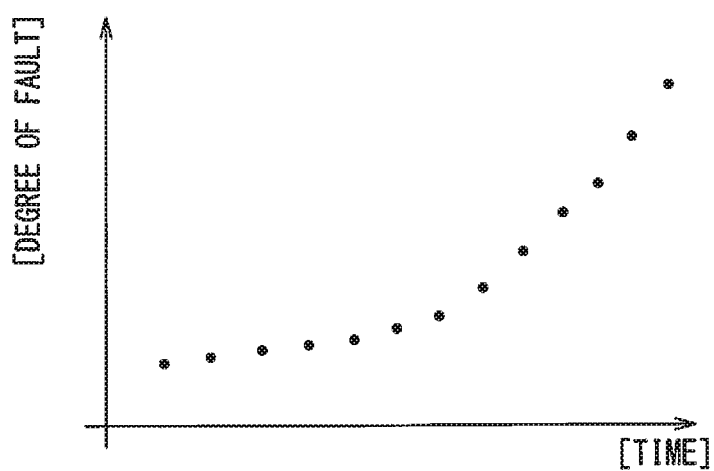
FIG. 8A, FIG. 8B and FIG. 8C are graphs (type 1) for explaining exemplary index values representing the degrees of fault in the fault prediction system according to the embodiment.
Figure 8B:
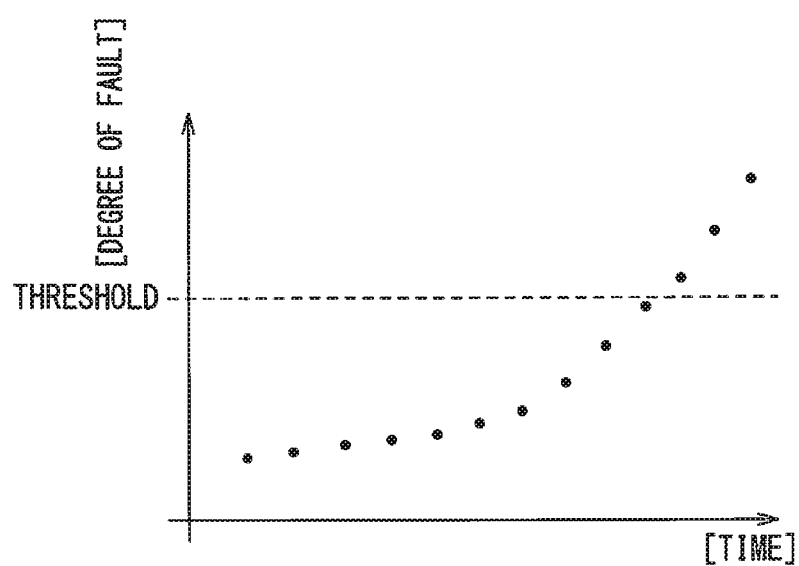
Figure 8C:
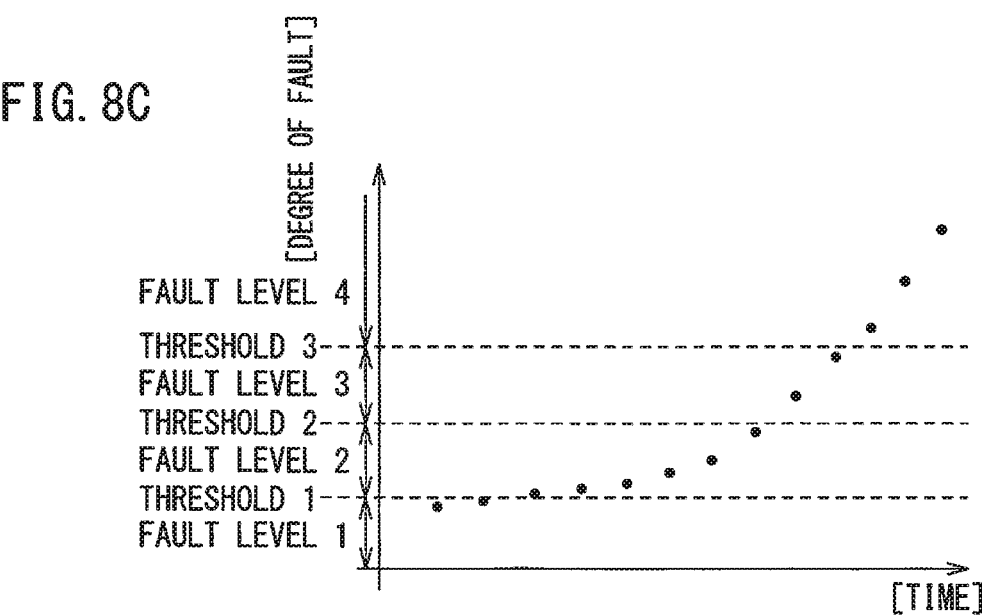

FIG. 6A and FIG. 6B are views for explaining an exemplary recurrent neural network, in which FIG. 6A represents how Elman network extends along the time axis, and FIG. 6B represents the BPTT (Back Propagation Through Time) in the error backpropagation method. Backpropagation is applicable as long as an Elman network architecture, as depicted as FIG. 6A, is used.

However, in the Elman network, unlike the normal neural network, the error propagates backwards in time, as depicted as FIG. 6B. Such backpropagation is called the BPTT (Back Propagation Through Time). The use of such a neural network architecture allows estimation of a model for the output, based on the past input transition to use, for example, information indicating whether the estimated output value is equal to a certain outlier, for the relationship with the occurrence of a fault.

In fault prediction (to be described later), the output layer outputs information indicating whether a fault has occurred or the "degree of fault" corresponding to the above-mentioned fault information in response to the state variables input to the input layer of the neural network. The "degree of fault" may have its maximum or minimum value limited or be a continuous or discrete quantity.

The machine learning device and the machine learning method according to the above-described embodiment can learn fault prediction according to the actual circumstances of use, which is more accurate than fault prediction based on the determination data output from the determination data obtaining unit 51. In other words, highly accurate fault prediction can be achieved even when factors which may lead to faults are complicated and it is difficult to preset fault prediction.

In an embodiment, when the determination data obtaining unit 51 obtains determination data representing a fault of the machine tool 2, the learning unit 53 may update the fault prediction by weighting each of the pieces of determination data in accordance with the length of time from when each of the pieces of determination data is obtained until a fault occurs. The shorter the time from when determination data is obtained until a fault actually occurs, the closer the estimated state is to a state directly related to the occurrence of a fault. Therefore, the above-mentioned fault prediction can be effectively learned by weighting the determination data in accordance with the time elapsed after a data set is obtained.

In an embodiment, the learning unit 53 may learn fault prediction of the main shaft 212 or the motor 214 that drives the main shaft 212, in accordance with data sets generated for a plurality of machine tools 2. The learning unit 53 may obtain data sets from a plurality of machine tools 2 used in the same location or learn fault prediction using data sets collected from a plurality of machine tools 2 independently operating in different locations. A machine tool 2 may be added, in the course of data collection, to a group of machine tools from which a data set is collected or, conversely, may be excluded from a group of machine tools from which a data set is collected.

As methods for having data sets for a plurality of machine tools 2 in common (sharing), three examples will be given below, but other methods may be applicable, as a matter of course. As a first example, a method for sharing the same model for a neural network is available, in which, for example, the difference between respective machine tools 2 is sent and reflected using communication means, for each weighting factor of a network. As a second example, the weight of the machine learning device 5 and the like may be shared by sharing data sets of the input and output of a neural network. As a third example, a given database is provided and is accessed to load a more appropriate model for a neural network to share the state (use similar models).

FIG. 7 is a block diagram illustrating an exemplary fault prediction system according to another embodiment. A fault prediction system 1 according to this embodiment includes a fault prediction device 4 which generates fault information for a machine tool 2 using the learning result obtained by a machine learning device 5, as illustrated as FIG. 7. FIG. 7 does not illustrate reference signs and the like in the machine learning device 5 and the machine tool 2.

The fault prediction device 4 includes a state observation unit 41 and a fault information output unit 42. The state observation unit 41 functions similarly to the state observation unit 52 described with reference to FIG. 1 and obtains state variables reflecting the states of the machine tool 2 and the surrounding environment. The fault information output unit 42 outputs the fault information of the machine tool 2 in response to input of the state variables via the state observation unit 41, based on the learning result obtained by a learning unit 53 of the above-mentioned machine learning device 5 in accordance with a data set.

A motor controller 33 includes a notifying unit (fault information notifying unit) 32, as depicted in FIG. 7. The notifying unit 32 notifies the operator of the fault information output from the fault information output unit 42. The mode in which the operator is notified of the fault information is not particularly limited as long as the fault information is identifiable to the operator. Various modes are possible, such as the mode in which information indicating whether a predicted fault has occurred or the degree of fault is displayed on a display (not illustrated) or a mode in which an alarm sound is produced in accordance with the details of the fault information.

FIG. 8A, FIG. 8B, FIG. 8C and FIG. 9 are graphs for explaining exemplary index values representing the degrees of fault (first to fourth examples) in the fault prediction system according to the embodiment. Referring to FIG. 8A, FIG. 8B, FIG. 8C and FIG. 9, the abscissa represents time (elapse of time) and the ordinate represents the degree of fault. First, the fault prediction system may be configured such that in, e.g., the first example, an index value representing the "degree of fault" may be determined to be higher as a state closes to a fault state, and the fault information output unit 42 outputs the index value obtained by learning, directly as fault information, as illustrated as FIG. 8A. In, e.g., the second example, a threshold may be set for the above-mentioned index value, and the fault information output unit 42 can output as fault information, information indicating whether a fault has occurred by defining a value equal to or larger than the threshold as being abnormal, and a value smaller than the threshold as being normal, as illustrated as FIG. 8B. In, e.g., the third example, a plurality of thresholds (thresholds 1 to 3) may be set for the above-mentioned index value, and the fault information output unit 42 can output, as fault information, a level of the fault obtained by partitioning the faults according to each threshold (fault levels 1 to 4), as illustrated as FIG. 8C.

Figure 9:
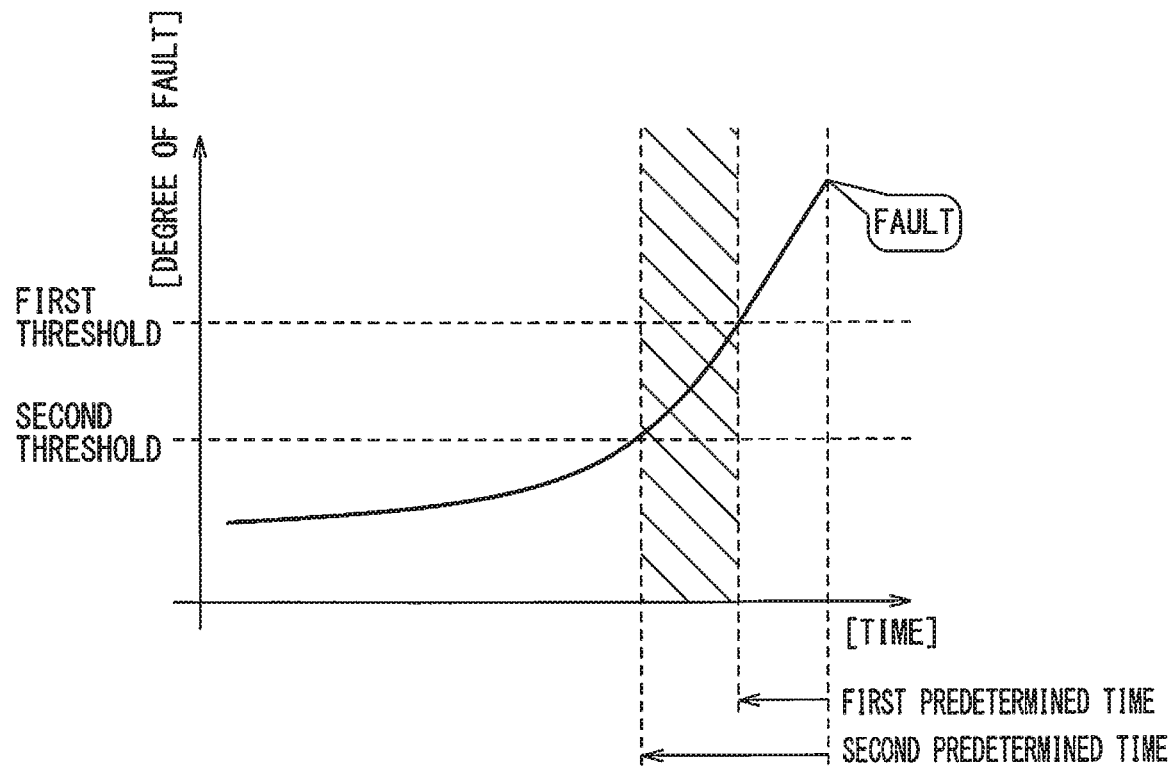
FIG. 9 is a graph (type 2) for explaining an exemplary index value representing the degree of fault in the fault prediction system according to the embodiment.

In, e.g., the fourth example, a relationship between the above-mentioned index value and the time until a fault occurs is obtained based on a plurality of pieces of data (teacher data) which lead to faults, and a first threshold for satisfying precedence to a time defined by a first predetermined period preceding the time at which a fault occurs is, in turn, obtained based on the obtained relationship, as illustrated in FIG. 9. A second threshold for satisfying subsequence to a time defined by a second predetermined period preceding the time at which a fault occurs is further determined. When at least one of the conditions that the index value is smaller than the first threshold and that the index value is equal to or larger than the second threshold is satisfied, the fault information output unit 42 may output as fault information the index value itself or a level of the index value, wherein the levels are created by separating the scale of the index value according to the thresholds. A threshold can be determined in this case, for example, by determining the threshold such that the past teacher data satisfies all conditions, or determining the threshold set with a margin as appropriate, and further, determining the threshold such that the determination errors within a certain range of probability is stochastically tolerated.

Figure 10:
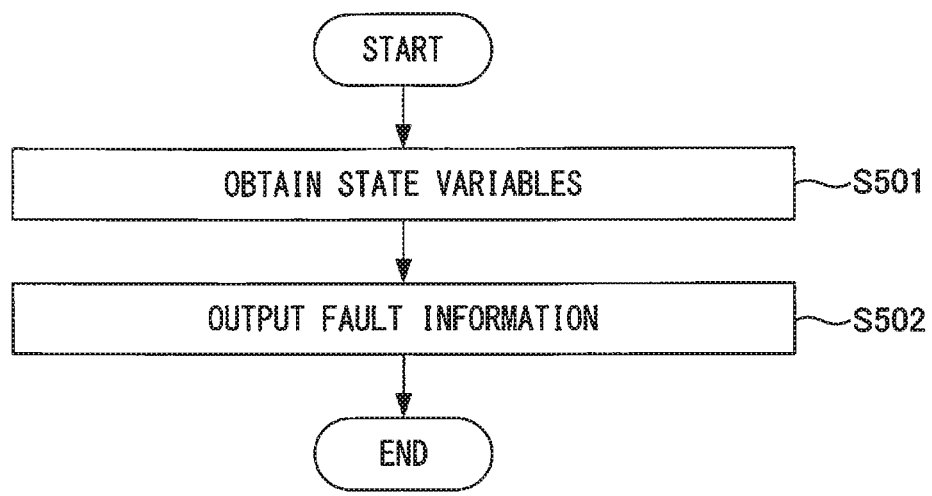
FIG. 10 is a flowchart for explaining an exemplary process of fault prediction which exploits a learning result.

FIG. 10 is a flowchart for explaining an exemplary process of fault prediction which exploits a learning result. As illustrated as FIG. 10, when an exemplary process of fault prediction which exploits the learning result obtained by the machine learning device 5 is started, in step S501 the state observation unit 41 obtains state variables including, e.g., a torque command value and a velocity command value output from the motor controller 3, a driving current and a rotational velocity output from a detector 11, the vibration of a main shaft 212 or a motor 214 output from a measuring device 12, and the sound and the temperature in the vicinity of the main shaft 212 or the motor 214.

The process advances to step S502, in which the fault information output unit 42 outputs fault information according to the state variables obtained in step S501, based on the above-mentioned learning result obtained by the machine learning device 5. When the fault prediction system 1 includes a notifying unit 32, the step of notifying the operator of fault information may be executed after step S502.

The process of fault prediction by the fault prediction device 4 described with reference to FIG. 10 may be performed when the machine tool 2 executes a specific operation determined in advance. Alternatively, the processes in steps S501 and S502 may be continuously executed in parallel while the machine tool 2 is in operation or at rest. The process of fault prediction may even be periodically performed at predetermined time instants.

In this embodiment, the machine learning device 5 may execute machine learning in parallel with fault prediction by the fault prediction device 4. In this case, while the fault prediction device 4 generates fault information, the learning unit 53 of the machine learning device 5 learns fault prediction again, based on the determination data obtained by a fault determination unit 31 or via the operator operation, and the state variables at this point in time.

Although an embodiment in which machine learning is performed using a neural network has been described above, machine learning may be performed in accordance with other known methods such as genetic programming, functional logic programming, or support vector machine. Again, in this specification, a "machine tool" means various mechanical devices including industrial robots, service robots, and machines controlled by CNC (Computer Numerical Control) devices, as described earlier.

In this manner, a machine learning device and a machine learning method, and a fault prediction device and a fault prediction system including the machine learning device according to this embodiment can detect a symptom of a fault of a main shaft of a machine tool or a motor which drives the main shaft before the main shaft or the motor suffers the fault. Further, a machine learning device and a machine learning method, and a fault prediction device and a fault prediction system including the machine learning device according to this embodiment can find a symptom of a fault in a main shaft or a motor of a machine tool earlier than the conventional techniques to reduce the downtime. Again, a machine learning device and a machine learning method, and a fault prediction device and a fault prediction system including the machine learning device according to this embodiment can estimate the life of a main shaft or the like by a comparison with the past learning to allow more planned repairing and limited-product arrangement to reduce the downtime and the cost.

A machine learning device and a machine learning method, and a fault prediction device and a fault prediction system including the machine learning device according to the present invention can achieve an effect that a symptom of a fault of a main shaft of a machine tool or a motor which drives the main shaft can be detected before the main shaft or the motor suffers the fault. Further, a machine learning device and a machine learning method, and a fault prediction device and a fault prediction system including the machine learning device according to the present invention achieves an effect of finding a symptom of a fault in a main shaft or a motor of a machine tool earlier than the conventional techniques to reduce the downtime. Again, a machine learning device and a machine learning method, and a fault prediction device and a fault prediction system including the machine learning device according to the present invention achieves an effect of estimating the life of a main shaft or the like by a comparison with the past learning to allow more planned repairing and limited-product arrangement to reduce the downtime and the cost.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning fault prediction of one of a main shaft of a machine tool and a motor which drives the main shaft, the machine learning device comprising:
a processor configured to
observe a state variable comprising at least one of data output from a motor controller configured to control the motor, data output from a detector configured to detect a state of the motor, and data including a state of the one of the main shaft and the motor,
obtain determination data upon determining one of whether a fault has occurred in the one of the main shaft and the motor and a degree of fault, and
learn the fault prediction of the one of the main shaft and the motor in accordance with a data set generated based on a combination of the state variable and the determination data, wherein the processor is configured to, in response to obtaining the determination data indicating a fault of the one of the main shaft and the motor, update a conditional equation used for the fault prediction by weighting the determination data in the data set in correlation with a length of time from when the determination data is obtained until the fault occurs,
the processor is configured to
perform a health check operation causing the main shaft to perform a predetermined operation pattern during a predetermined time interval, and
observe the state variable in at least one of an accelerated state of the main shaft, a constant velocity-operated state of the main shaft, and one of a decelerated state of the main shaft and a coasted state of the main shaft upon cutoff of a driving force, in the predetermined operation pattern, to learn the fault prediction of the one of the main shaft and the motor, and
the health check operation includes causing the main shaft to be in the coasted state to observe the state variable and identify a symptom of the fault different from that in the decelerated state.

2. The machine learning device according to claim 1, wherein
the data output from the motor controller comprises a torque command value and a velocity command value for driving the motor,
the detector comprises at least one of a current detector configured to detect a current of the motor and a velocity detector configured to detect a velocity of the motor, and
the processor is configured to observe the data output from at least one of
a vibration sensor configured to measure vibration of the one of the main shaft and the motor,
a sound collection microphone configured to measure a sound in vicinity of the one of the main shaft and the motor, and
a temperature sensor configured to measure a temperature in the vicinity of the one of the main shaft and the motor.

3. The machine learning device according to claim 1, wherein the processor is configured to learn the fault prediction of the one of the main shaft and the motor in accordance with a plurality of data sets generated for the one of the main shaft and the motor.

4. The machine learning device according to claim 1, wherein the processor is configured to learn a normal state only during a certain period and detect occurrence of a fault.

5. The machine learning device according to claim 1, wherein the processor is configured to obtain a current state variable of the state variable via a network.

6. A fault prediction device for predicting a fault of the one of the main shaft and the motor, the fault prediction device comprising the machine learning device according to claim 1 and configured to output fault information indicating one of whether a fault has occurred in the one of the main shaft and the motor and a degree of fault, in response to input of a current state variable of the state variable, based on a learning result obtained by the machine learning device in accordance with the data set.

7. The fault prediction device according to claim 6, wherein the machine learning device is configured to learn the fault prediction of the one of the main shaft and the motor again in accordance with an additional data set generated based on a combination of the current state variable and the determination data.

8. The fault prediction device according to claim 6, wherein the machine learning device is located on a cloud server.

9. The fault prediction device according to claim 6, further comprising a controller including the machine learning device and configured to control the machine tool.

10. The fault prediction device according to claim 6, wherein the machine tool comprises a plurality of machine tools, and the learning result obtained by the machine learning device is shared by the plurality of machine tools.

11. A fault prediction system comprising:
the fault prediction device according to claim 8;
the detector;
a sensor or a microphone configured to measure the state of the one of the main shaft and the motor; and
a display or an alarm configured to notify an operator of the fault information.

12. The fault prediction system according to claim 11, wherein a time at which the display or the alarm is configured to notify the operator of the fault information satisfies at least one of precedence to a time defined by a first predetermined period preceding a time at which a fault occurs, and subsequence to a time defined by a second predetermined period preceding the time at which a fault occurs.

13. A machine learning method of learning fault prediction of one of a main shaft of a machine tool and a motor which drives the main shaft, the method comprising:
observing a state variable comprising at least one of data output from a motor controller which controls the motor, data output from a detector which detects a state of the motor, and data including a state of the one of the main shaft and the motor;
obtaining determination data upon determining one of whether a fault has occurred in the one of the main shaft and the motor and a degree of fault;
learning the fault prediction of the one of the main shaft and the motor in accordance with a data set generated based on a combination of the state variable and the determination data, and
in response to obtaining the determination data indicating a fault of the one of the main shaft and the motor, updating a conditional equation used for the fault prediction by weighting the determination data in the data set in correlation with a length of time from when the determination data is obtained until the fault occurs, wherein
the method further comprises
performing a health check operation causing the main shaft to perform a predetermined operation pattern during a predetermined time interval, and
observing the state variable in at least one of an accelerated state of the main shaft, a constant velocity-operated state of the main shaft, and one of a decelerated state of the main shaft and a coasted state of the main shaft upon cutoff of a driving force, in the predetermined operation pattern, to learn the fault prediction of the one of the main shaft and the motor, and
the health check operation includes causing the main shaft to be in the coasted state to observe the state variable and identify a symptom of the fault different from that in the decelerated state.

* * * * *